Oct. 12, 1965 W. A. RAY 3,211,417
OIL-FILLED SOLENOID VALVE CONSTRUCTION
Filed July 17, 1961 3 Sheets-Sheet 1

INVENTOR.
WILLIAM A. RAY
BY
Lyon & Lyon
ATTORNEYS.

Oct. 12, 1965 W. A. RAY 3,211,417
OIL-FILLED SOLENOID VALVE CONSTRUCTION
Filed July 17, 1961 3 Sheets-Sheet 2
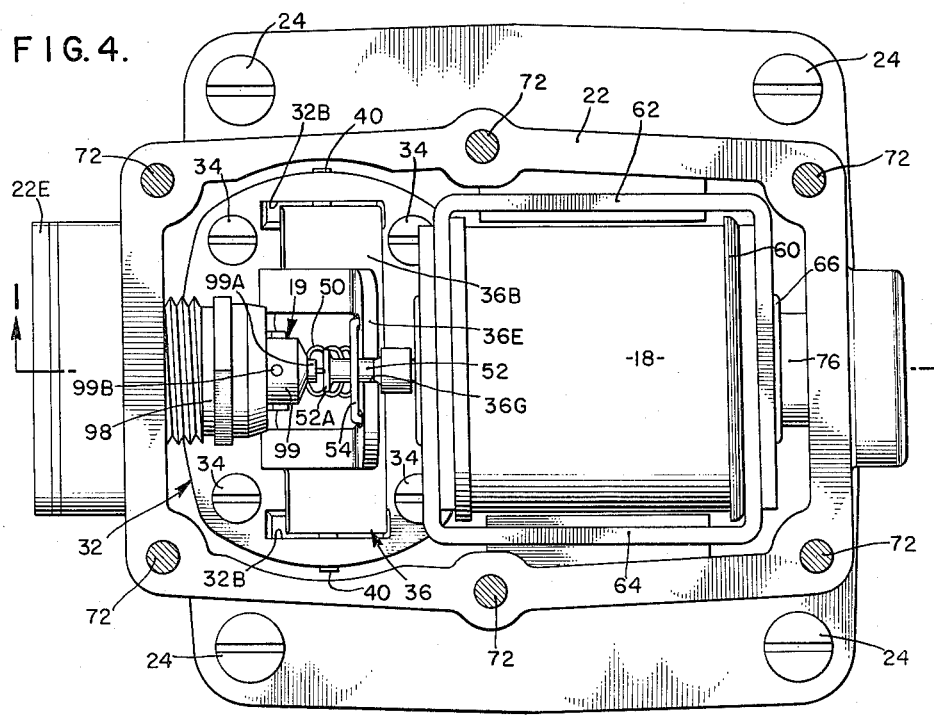
FIG. 4.
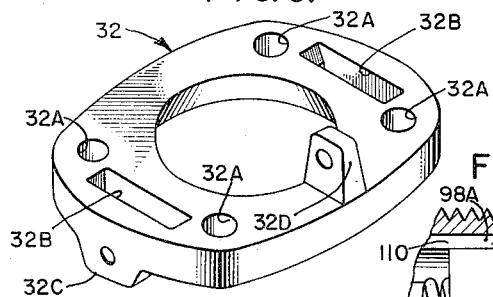
FIG. 5.
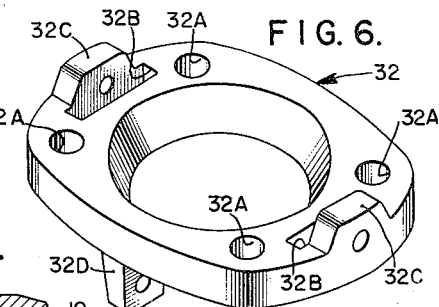
FIG. 6.
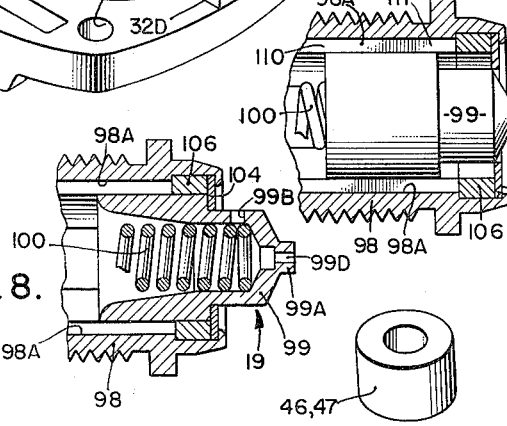
FIG. 9.
FIG. 8.
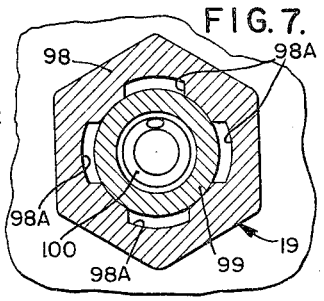
FIG. 7.
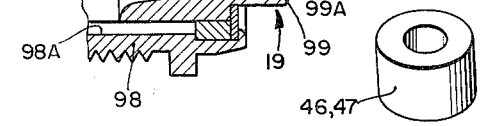
FIG. 10.
INVENTOR.
WILLIAM A. RAY
BY
Lyon & Lyon
ATTORNEYS.

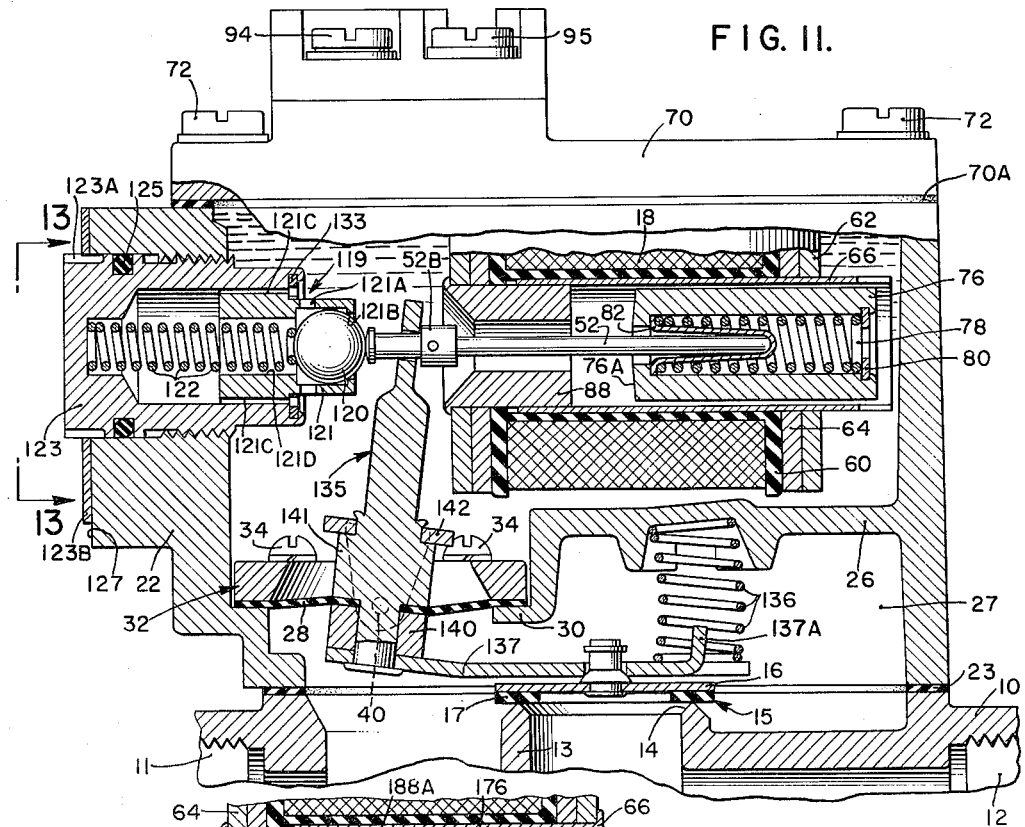
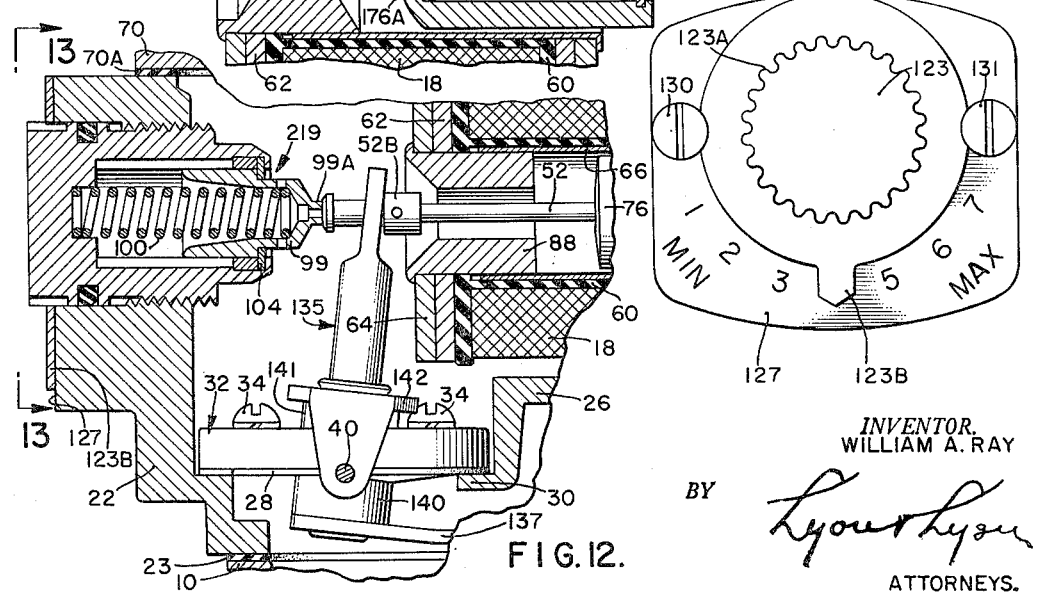

United States Patent Office 3,211,417
Patented Oct. 12, 1965

3,211,417
OIL-FILLED SOLENOID VALVE CONSTRUCTION
William A. Ray, North Hollywood, Calif., assignor to International Telephone and Telegraph Corporation, Baltimore, Md., a corporation of Maryland
Filed July 17, 1961, Ser. No. 124,538
9 Claims. (Cl. 251—138)

The present invention relates to improvements in solenoid-operated valves and particularly those containing a liquid for the purpose of quelling A.C. hum as well as for achieving a controlled opening of the associated gas valve when the solenoid is energized.

Briefly the present invention relates to an improvement in the type of solenoid-operated valve. The present construction is directed generally to the obtainment of the same features, namely the use of a liquid to both quell A.C. hum as well as to achieve a controlled opening of the associated gas valve when the solenoid is energized. In the instant case these features are obtained as well as other features using a more simple and inexpensive construction. The present construction involves a new structural coaction between the movable solenoid plunger and its stop to permit larger manufacturing tolerances as well as to assure efficient liquid flow. Also, the number of parts is minimized. Other novel features involve the use of a different magnetic structure, and the placement of a strain release and storing spring within the plunger itself, leading to the result that the initial flow of current to the solenoid coil when the same is energized is much lower and approaches the value of current required to continuously maintain the solenoid in its energized condition. Also, a more uniform slow opening of the gas valve results regardless of relatively large variations in the magnitude of the voltage of the supply source. Further, transient hum (that hum which would otherwise occur during the time the plunger is moving to its attracted position) has less possibility of exerting its effect since the plunger is seated now in a relatively short period of time after which the controlled opening of the associated gas valve is being accomplished.

Another important feature of the invention is that the arm interconnecting the solenoid plunger with the gas valve is now pivoted in a plane coextensive with the plane of the diaphragm which separates the gas chamber from the oil-filled chamber.

It is therefore a general object of the present invention to provide an improved construction embodying these features.

A specific object of the present invention is to provide a solenoid-operated gas valve of this character which may be made relatively simply and inexpensively.

Another specific object of the present invention is to provide an improved construction of this character in which the magnitude of the initial in-rush current to the solenoid when initially energized is more comparable to that magnitude of the current required to maintain the solenoid in its energized condition.

Another specific object of the present invention is to provide an improved construction of this character in which the solenoid plunger is moved relatively quickly to its seated position after energization of the coil so as to minimize the possibility of transient hum, i.e. hum during movement of the solenoid plunger from its unattracted position to its attracted position.

Another specific object of the present invention is to provide an improved construction of this character in which the arm interconnecting the plunger and the solenoid valve is pivoted in a plane which corresponds to the plane of the diaphragm separating the gas chamber from the oil-filled chamber.

Another specific object of the present invention is to provide an improved construction of this character in which there is a novel structural coaction between the plunger and its stop for achieving the results indicated above.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

FIGURE 1 in general is a longitudinal sectional view through an improved solenoid-operated gas valve taken substantially along the line 1—1 in FIGURE 4.

FIGURE 4 is a view taken generally along the line 4—4 in FIGURE 1.

FIGURES 5 and 6 are each perspective views showing respectively the top and bottom side of the diaphragm clamping ring structure.

FIGURE 7 is a view taken generally along the line 7—7 in FIGURE 1.

FIGURE 8 shows in enlraged form a portion of the construction shown in FIGURE 1.

FIGURE 9 shows the structure of FIGURE 8 in a different operating position.

FIGURE 10 is a perspective view illustrating one of the spacing washers that abuts the diaphragm in FIGURE 1.

FIGURES 11 and 12 are longitudinal sectional views through modified forms of the invention, FIGURE 13 being an elevation view taken on lines 13—13 in either FIGURE 11 or 12.

FIGURE 14 illustrates a modified from plunger and stop construction for incorporation in FIGURE 11.

Figure 1:
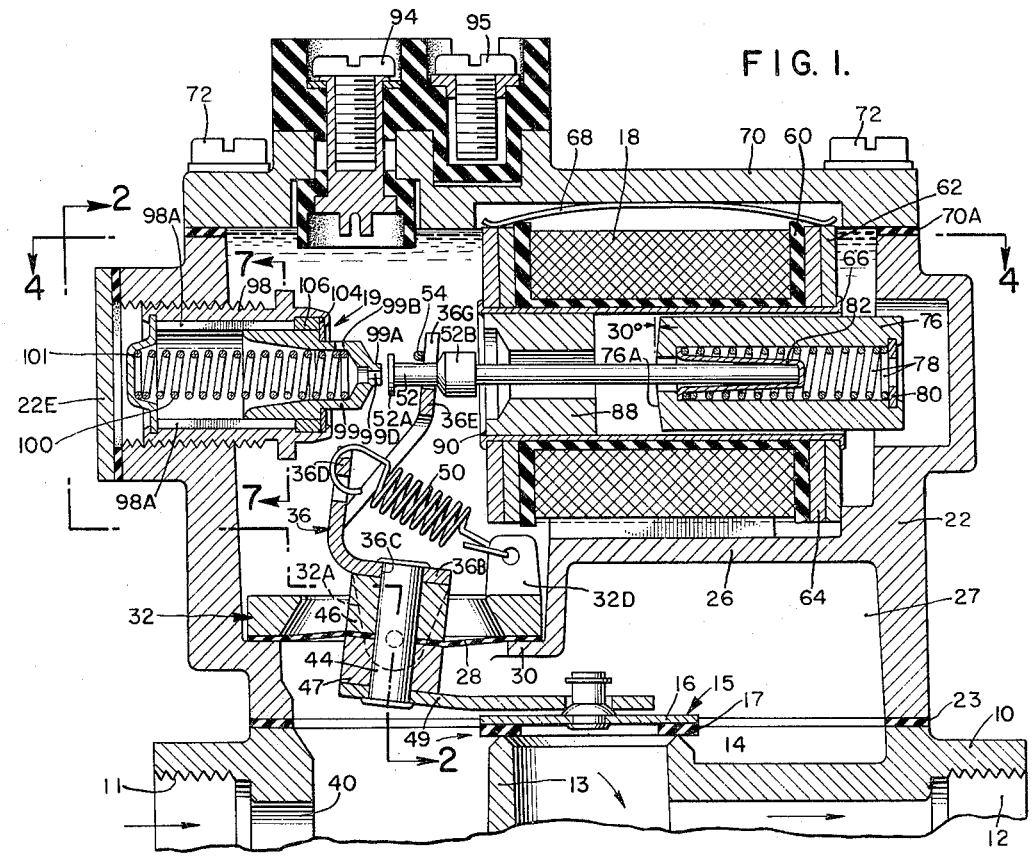

Referring to the drawings, there is illustrated a valve body 10 having aligned inlet and outlet openings 11 and 12 respectively with a circularly angled partition 13 between the same forming at its upper end a raised valve seat 14 engageable with the valve closure member 15, such closure member 15 comprising an apertured disc 16 to which is suitably secured the circular valve gasket 17. This valve closure member 15 is maintained in a normally closed condition as shown in FIGURE 1 and is moved to its fully open position upon energization of the solenoid coil 18, the resulting movement of the closure member 15, however, being controlled by the dashpot structure 19. Briefly, such movement is controlled such that initially the movement of the closure member 15 is at a relatively high rate, then a relatively slow rate and then at a relatively high rate in that order as will be more clearly ascertainable from the following description.

A casing or housing 22 in which the solenoid 18 and dashpot 19 are mounted is secured to the valve body 10 with the gasket 23 sandwiched therebetween by the four machine screws 24 (FIGURE 4).

The lower raised wall 26 of casing 22 and the flexible diaphragm 28 define walls of the chamber 27 through which gas may flow when the valve is open.

This diaphragm 28 has its peripheral edge clamped between an annular flanged portion 30 of casing 22 and the clamping ring structure 32, details of which are illustrated more clearly in FIGURES 5 and 6. This ring structure 32 is secured to the casing 22 by four bolts 34 passing through the four apertured portions 32a.

Figure 2:
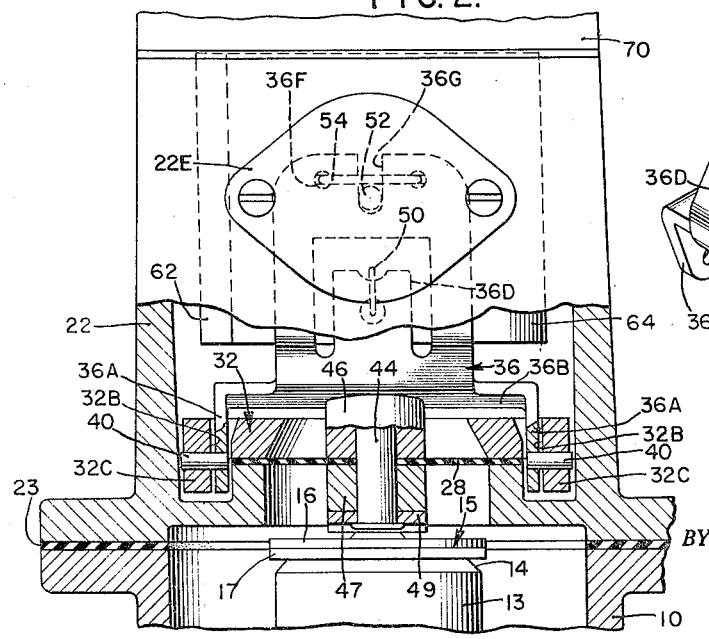
FIGURE 2 is a view taken generally along the line 2—2 in FIGURE 1.

The ring structure 32 includes also a pair of diametrically disposed rectangular apertured portions 32 B throug which the pair of downwardly extending tongues 36A of the actuating arm 36 (FIGURE 3) may extend and be pivotally attached by means of pins 40 (FIGURES 3 and 2) to the downwardly extending projections 32C of the ring member. This construction as clearly illustrated in FIGURE 2, is one in which the arm 36 is pivoted about an axis (the axes of pins 40) which lies in and coextensive with the plane of the diaphragm 28. This is one of the important constructional features of the present invention.

Figure 3:
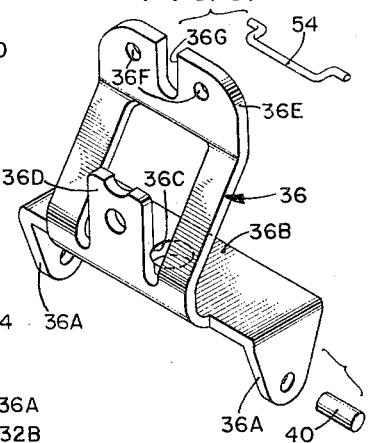
FIGURE 3 is a perspective view illustrating elements used in interconnecting the solenoid plunger with the gas valve.

The diaphragm 28 has centrally attached thereto by means of rivet 44 the arm portion 36B, the pair of spacing washers 46 and 47 and the valve arm 49 which in turn has loosely mounted thereon the aforementioned apertured valve disc 16. For such fastening purposes the arm 36 is apertured at 36C as indicated in FIGURE 3.

A coil tension spring 50 having one of its ends anchored on the upstanding projection 32D of the ring structure 32 and the other one of its ends attached to the apertured portion 36D of arm 36 normally maintains the valve 15 in its closed position shown in FIGURE 1. For purposes of opening such valve 15, the upper end 36E or arm 36 is attached to the solenoid-operated operated rod 52 using the clamping wire 54 (FIGURE 3) having its end bent so as to be secured in the apertured portions 36F of arm 36. It is noted that the rod 52 extends through the elongated open-ended slotted portion 36G so that the arm 36 is free to move both axially and radially with respect to the longitudinally movable rod 52.

The rod 52 is moved by the solenoid construction which is now described.

The winding of solenoid 18 is mounted in conventional manner on an insulated spool 60. Opposite ends of spool 60 are embraced by a pair of generally U-shaped magnetic flux-carrying members 62 and 64 of cold rolled steel and the same are interleaved as illustrated in FIGURE 4 with one end of each of the members 62 and 64 contacting the spool 60. These members 62 and 64 are secured in this position by the so-called guide tube 66 which pass through apertured portions of the members 62 and 64 and has its ends crimped over as illustrated in FIGURE 1 to form a unitary structure wherein the members 62 and 64 provide a magnetic bridge between opposite ends of the coil 18. This unitary solenoid construction may be secured in the housing 22 using a construction wherein the lowermost portions of the members 62 and 64 are snugly fitted in grooved portions in the casing 22 after which, if desired, a bowed stressed spring 68 may be placed between the magnetic structure 62, 64 and the cover member 70 which is secured to the casing 22 by bolts 72 (FIGURE 4) with a suitable gasket 70A sandwiched therebetween.

The plunger 76 in the form of a modified cylinder is fabricated to incorporate the strain release coil compression spring 78 which has one of its ends bearing against a spring retaining washer 80 recessed in a grooved portion of the plunger 76 and the other one of its ends pressing the annular lip portion of the conical-shaped rod seat 82 against an internal shouldered portion of the plunger 76. It will be understood that the plunger 76 is free to move in the so-called guide tube but that the stop therefor, namely the apertured cylindrical member 88, is secured to the tube 66 as, for example, by welding or brazing 90. It will also be observed that that portion of the plunger 76 facing the stop member 88 defines an inwardly radially tapered surface 76A having a taper of approximately 30 degrees with, of course, the central portion extending closer to the stop 88 than the peripheral portion of the plunger 76. This is for purposes of obtaining substantially only a line contact between the plunger 76 and stop 88 in the energized position of the plunger 76. Generally the purpose of this particular construction involves the fact that the interior of the casing 22 is filled with a liquid such as, for example, a heavy viscous silicon oil for hum-quelling purposes, such liquid being also in the form of a thin film between the plunger 76 and the so-called guide tube 66. The purpose of this particular arrangement is to quell A.C. hum; and this is believed to be accomplished considering that the liquid itself serves as an element of a low pass filter, i.e. a mechanical filter which permits movement of the plunger 76 at a relatively slow rate but substantially prevents movement of the plunger at a higher rate that is commensurate with the frequency of the alternating current applied to the coil 18. It will be noted also for these purposes that opposite ends of the plunger 76 are always in free communication with the reservoir of liquid contained within the casing 22, this being so since the plunger 76 as well as the stop member 88 each have a central opening therethrough communicating opposite ends of the plunger 76 to the main body of the oil reservoir.

It will thus be seen that upon energization of the coil 18, which may have its terminals suitably connected to the binding posts 94, 95 insulatedly mounted on the casing cover 70, the plunger 76 is moved to the left in FIGURE 1 against the stop member 88 carrying with it the plunger or rod 52 seated in its spring-biased seat 82. This results in opening of the valve 15. Opening of such valve 15 is, however, accomplished at a controlled rate or rates through action of the dashpot 19 now described.

The dashpot 19 includes an externally-threaded cylinder 98, screw-threadedly mounted in the wall of casing 22 for purposes of adjusting the normal spacing between, on the one hand, the flanged portion 52A of rod 52 and protruding extension 99A of the piston member 99. This piston member 99 is normally biased to its position shown in FIGURE 1 by the prestressed coil compression spring 100 having one of its ends bearing on the spring seat 101 recessed in an annular groove in the cylinder 98, the other end of spring 100 bearing on an internal shouldered portion of the piston 99. The internal bore of the piston 98 in which the piston 99 is slidable is provided with four grooved portions 98A extending longitudinally of such cylinder as indicated in FIGURE 7.

The piston 99 is retained in the cylinder by engagement of a shouldered portion of the piston 99 with a snap ring 104 recessed in the interior of the cylinder to also retain an annular ring 106 against another internal shouldered portion of the cylinder 98. It is observed also that the piston 99 has a radially extending opening or bore 99B which communicates the interior of the piston with the surrounding oil reservoir; and for the same purpose the forward end 99A of the piston is provided with an axially-extending bore 99D.

The opening of the valve 15 is thus controlled in the following manner.

Upon energization of the coil 18, the valve closure member 17 is initially opened at a fast rate until the plunger end 52A abuts the piston end 99A, at which time the piston bore 99D is closed. At this time the dashpot action occurs. However, the plunger 76 continues to move relatively rapidly towards its engagement with the stop 88 because of the relative weakness of spring 78 which permits the plunger 76 to assume its final position against the stop 88 prior to the time that the valve 15 is fully opened. Yet, this spring 78, which may also be considered to be a strain release spring, exerts a force on the piston through the rod 52 of sufficient force to cause the piston 99 to move to the left in FIGURE 1 against the biasing action of the spring 100. This means, at this time the spring 78 is "stiffer" or "stronger" than the spring 100.

Thus, after initial engagement between the rod end 52A and the piston end 99A, the captured liquid within the cylinder 98 escapes at a relatively small controlled rate determined by the size of the piston apertured portion 99B. Thus the valve 15 continues to be opened at a relatively slow rate at this time until the condition illustrated in FIGURE 9 is achieved, at which time there is a much greater escape path provided for the captured oil, i.e. through the cylinder grooves 98A as indicated by the arrows 110 and 111. The valve 15 then moves to its final fully open position at a relatively fast rate. It is noted that during these times the valve-actuating arm 36 is being constantly pressed against the rod shouldered portion 52B by the spring 50. It is noted also that there is a spacing between the rod shouldered portion 52A and the shouldered portion 52B in which the upper end of the actuating arm 36 may move when the solenoid 18 is subsequently de-energized.

Upon de-energization of the solenoid 18, the plunger 76 returns to its normal unattracted position shown in FIGURE 1 under the combined influences of spring 50 and spring 78 which means also that the valve 15 is closed rapidly. This is a desirable condition. This condition is achieved by rendering the return movement of the valve closure member 16 independently of the condition of the dashpot 19. At the same time the dashpot 19 may also return quickly to its original condition since at this time the apertured portion 99D is open through which oil from the reservoir may enter and again fill the cylinder 98.

In cases where it is desired that the initial opening movement of the valve element 16 be further retarded, the piston 99 may be adjusted so that its end 99D contacts or is very closely spaced from the adjacent end 52A of the rod. This adjustment may be made by moving the composite dashpot 19 closer to the rod 52 and more specifically by turning the hexagonal portion of the cylinder (FIGURE 7), once the cover is removed. Alternately, in some cases this adjustment may be made by removing the side casing cover 22E and turning the firmly mounted spring seat 101 which in that case is provided with a suitable flat surface to allow application of a turning tool thereto. Preferably, however, it is desired that the spacing between the free end of the piston on the rod 52 be a factory adjustment requiring removal of the cover 70.

In the modification shown in FIGURE 11 the dashpot 119 includes a ball 120 housed or caged within plunger 121, the ball 120 being pressed by coil compression spring 122 in engagement with the end of valve actuating stem 52 with one end of the spring 122 rested against ball 120 and the other end of spring 122 being recessed within the back wall of adjustable cylinder 123.

Cylinder 123 is threaded in housing 22 with an O-ring seal 125 recessed therein contacting the adjacent wall of housing 22. The end of cylinder 123 as shown in FIGURE 13 includes an irregular peripheral portion 123A to facilitate turning the same to different adjusted positions which are indicated on calibrated plate 127 on housing 22. The plate 127 cooperates with cylinder pointer 123A to provide this indication and when once adjusted the cylinder may be locked by locking screws 130, 131 threaded in casing 22.

The plunger 121 is retained by retaining ring 133 recessed in cylinder 123 and includes the lateral vent ports 121A and the large axial opening 121B which is normally closed by ball 120 sealed therein. It will be understood that the cylinder 123 may be adjusted so that there is normally some spacing between ball 120 and the adjacent end of stem 52.

The valve actuating arm 135 in this case is biased into engagement with the adjustable collar 52B on stem 52 by coil compression spring 136 having one of its ends recessed in housing 26 and the other one of its ends bearing against a prolonged portion of arm 137 secured to arm 135, such prolonged portion having a tongue portion 137A extending upwardly into spring 136 to assure its retention. The valve member 16 is loosely mounted on arm 137. Here again the arm 135 is pivoted about an axis lying in the plane of diaphragm 28 about the axis of pivot pin 40. A spacer 140 is interposed between arm 137 and the diaphragm 28 and this spacer as well as the upper spacer 141 is retained by ring 142 secured on arm 135.

In operation of the device in FIGURE 11 there is again a fast opening of valve 15 until the plunger stem 52 engages ball 120 (this spacing between the ball and stem being adjustable to eliminate the free play or lost motion between the ball and stem if desired) after which the fluid within cylinder 123 is displaced by movement of ball 120, the fluid being displaced through the lateral ports 121A, through the axial opening 121B which is now uncovered and through the series of peripheral plunger grooved portions 121C until the ball is seated against the marginal edge of plunger bore 121D to thereby further slow up movement of plunger 121 and opening movement of valve 15. In the final stages of valve movement, such movement is governed by the flow of fluid through the grooved portions 121C only since the plunger bore 121D is now sealed by the ball.

When the solenoid is subsequently deenergized the valve 15 closes rapidly under the influence of spring 136 and by virtue of the loose or slidable connection between lever 135 and stem 52. The dashpot 119 is also quickly restored to its condition shown in FIGURE 11 since the spring 122 moves the ball out of sealing engagement with bore 121D to allow fluid to be expelled also through lateral ports 121A.

In the arrangement shown in FIGURE 12 the dashpot 219 is constructed essentially as described in FIGURE 1 and like parts having identical reference numerals, but the same is adjustable from the outside of the casing 22 in the manner described in connection with FIGURES 11 and 13. In this case also the lever 135 is biased by a spring using the construction involving spring 136 in FIGURE 11.

In each of these arrangements the stop member 88 is in the form of a hollow cylinder having right angle end portions while the cylinder plunger 76 has its stop contacting face tapered outwardly at an angle of thirty degrees as indicated in FIGURE 1 i.e. in the section as illustrated in FIGURE 1 the front lines defining the front face of the rounded plunger are inclined one hundred and twenty degrees with respect to the axis or direction of movement of the plunger. This particular geometry has been found to result in an unusually efficient arrangement from the viewpoint of a non-sticking arrangement commensurate with good magnetic efficiency.

The modification shown in FIGURE 14 may be substituted in FIGURE 11 and it will be observed that in this case the stop member 188 (corresponding to 88 in FIGURE 11) is undercut or countersunk and has its plunger engaging surface 188A in the form of a conical surface which is engageable with the rounded, bulbous or concave end 176A of plunger 176 (corresponding to plunger 76 in FIGURE 11). This construction results in a line contact between the plunger and its stop and is one which is of advantage from a mass production viewpoint in that such line contact is more easily controlled.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. In an A.C. solenoid-operated valve, said valve having closure means, solenoid means connected to said closure means for movement of the same, a chamber containing viscous liquid, said solenoid means including two relatively telescoping members with a film of said liquid therebetween for quelling hum when said solenoid means is energized with alternating current, the clearance space between said telescoping members and the viscosity of said film of liquid therebetween being such as to allow relative movement between said members at a relatively slow rate but to prevent relative movement therebetween at a high rate which is commensurate with the frequency of said alternating current, said solenoid means including a coil, one of said telescopic members being a magnetizable plunger of generally cylindrical form having disposed therein and confined therein, a coil compression spring, a rod seat also disposed within and confined within said plunger and biased by said last-mentioned spring to urge said plunger out of said coil in the deenergized condition of said coil, a rod engaging said rod seat and being attached to said closure means and energization of said coil moving said plunger and said rod equal distances in the same direction at different rates as determined jointly by the said retarding means and the bias of said spring.

2. In an A.C. solenoid valve for controlling supply of fuel gas to a burner, a valve casing having a passage therethrough, closure means in said casing for controlling flow through said passage and biased to closed position, an A.C. solenoid operator mounted on the outside of said casing and comprising a coil and a reciprocal plunger having an operating stem, spring-biased means confined within said plunger and contacting said operating stem, to urge said plunger out of said coil in the deenergized condition of said coil, means for guiding said plunger, means extending sealingly through an opening in the casing forming a connection between said stem and said closure means for moving said closure means to open position, means forming a housing around the solenoid operator, viscous liquid in said housing and extending between said plunger and its guide for quelling A.C. hum, the clearance space between said guide and said plunger and the viscosity of said liquid therebetween being such as to allow movement of said plunger relative to said guide at a relatively slow rate but to prevent relative movement therebetween at a high rate which is commensurate with the frequency of the alternating current, and liquid dashpot means mounted in said housing and exposed to said liquid for cooperating with said plunger stem for retarding movement of said closure means toward fully open position, the energization of said coil moving said plunger and said operating stem equal distances in the same direction at different rates as determined by the said spring biased means and said dashpot means.

3. A solenoid valve as set forth in claim 2 in which said means extending sealingly through said opening in said casing comprises a diaphragm, an arm connected between said stem and said closure means, and means for pivoting said arm about an axis which lies in a plane coextensive with the plane of said diaphragm.

4. In an A.C. solenoid-operated valve, said valve having closure means, solenoid means connected to said means for movement of the same, a fluid chamber containing fluid, said solenoid means comprising a magnetic structure having a coil, an armature attracted by said magnetic structure, a portion of said liquid being disposed in a clearance space between said armature and said magnetic structure, said clearance space between said armature and said magnetic structure and the viscosity of said liquid in said clearance space being such as to allow relative movement of said armature with respect to said magnetic structure at a relatively slow rate but preventing relatively rapid movement between said magnetic structure and said armature at a high rate which is commensurate with the frequency of the alternating current applied to said solenoid means for quelling A.C. hum, retarding means including a portion of said liquid, an operating stem, spring-biased means mounted in and confined within said armature and contacting said stem to urge said armature out of said coil in the deenergized condition of the coil, said stem being engageable with said retarding means for operating said retarding means, said retarding means being spaced a distance apart from said stem to provide a lost motion connection between said stem and said retarding means when said closure means is in its closed position, and said stem being connected to said closure means, energization of said coil moving said armature and said stem equal distances in the same direction at different rates as determined by said spring biased means and said retarding means.

5. A valve as set forth in claim 4 in which said solenoid means comprises a coil wound on a spool, and a pair of generally U-shaped magnetizable members encircle diametrically oppositely spaced ends of the coil to convey magnetic flux around opposite ends of the coil.

6. In an A.C. solenoid-operated valve, said valve having closure means, solenoid means connected to said means for movement of the same, a fluid chamber containing fluid, said solenoid means comprising a magnetic structure including a coil, an armature attracted by said magnetic structure, a portion of said liquid being disposed in a clearance space between said armature and said magnetic structure, said clearance space between said armature and said magnetic structure and the viscosity of said liquid in said clearance space being such as to allow relative movement of said armature with respect to said magnetic structure at a relatively slow rate but preventing relative movement between said magnetic structure and said armature at a high rate which is commensurate with the frequency of the alternating current applied to said solenoid means for quelling A.C. hum, retarding means including a portion of said liquid, said retarding means including a piston which is coaxially arranged with respect to movement of said armature, said retarding means including a cylinder containing a first spring acting between said cylinder and said piston for biasing said piston, an operating stem coaxially arranged with said piston and said armature, second spring means acting between said stem and said armature and urging said armature out of said coil in the deenergized condition of said coil, the last-mentioned spring means being stronger than said spring in said dashpot means, said stem being engageable with said piston and being attached to said closure means, said piston being spaced a distance apart from said stem to provide a lost motion connection between said stem and said piston when said closure means is in its closed position, energization of said coil moving said armature and said operating stem equal distances in the same direction at different rates as determined by said second spring and said dashpot means.

7. A solenoid-operated valve as set forth in claim 6 in which additional spring means normally biases said closure means in its closed position.

8. A solenoid-operated valve as set forth in claim 6 in which said stem is attached to said closure means through an arm that extends sealingly through said chamber, said chamber being separated from said closure means by a flexible diaphragm, and means for pivoting said arm about an axis which lies in a plane coextensive with the plane of said diaphragm.

9. An arrangement as set forth in claim 4 including means accessible from outside of said fluid chamber for adjusting said lost motion connection.

References Cited by the Examiner
UNITED STATES PATENTS

| 2,489,381 | 11/49 | Lindahl | 317—178 X |
| 2,519,291 | 8/50 | Sandin | 317—178 X |
| 2,636,516 | 4/53 | Armstrong et al | 251—80 X |
| 2,675,508 | 4/54 | Ray | 251—138 X |
| 2,698,159 | 12/54 | Crum | 251—77 X |
| 2,920,254 | 1/60 | Ray | 317—191 |
| 2,936,997 | 5/60 | Nickells | 251—54 |
| 2,947,510 | 8/60 | Ray | 251—54 |
| 2,988,675 | 6/61 | Bancroft | 317—191 |
| 3,027,132 | 3/62 | Smith | 251—54 |

ISADOR WEIL, *Primary Examiner.*